Figure 1:
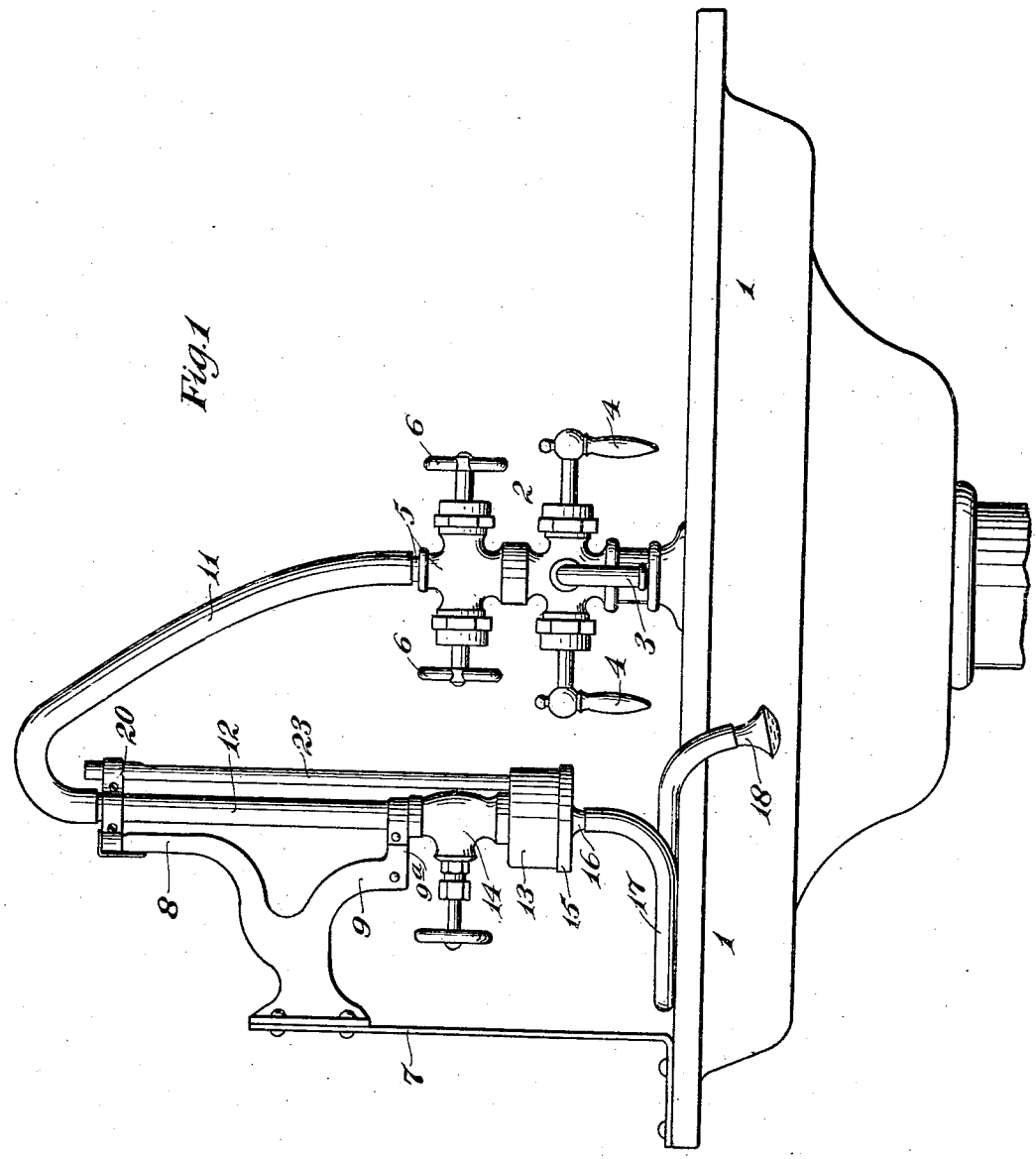

C. E. & W. H. KRUEGER.
ATTACHMENT FOR REGULATING AND INDICATING THE TEMPERATURE OF RUNNING WATER.
APPLICATION FILED JULY 6, 1908.

936,548.

Patented Oct. 12, 1909.

2 SHEETS—SHEET 1.

Witnesses:
L. G. Zesbaugh
W. H. Souba

Inventors:
CHAS. E. KRUEGER.
WM. H. KRUEGER.
By their Attorneys
Williamson & Merchant

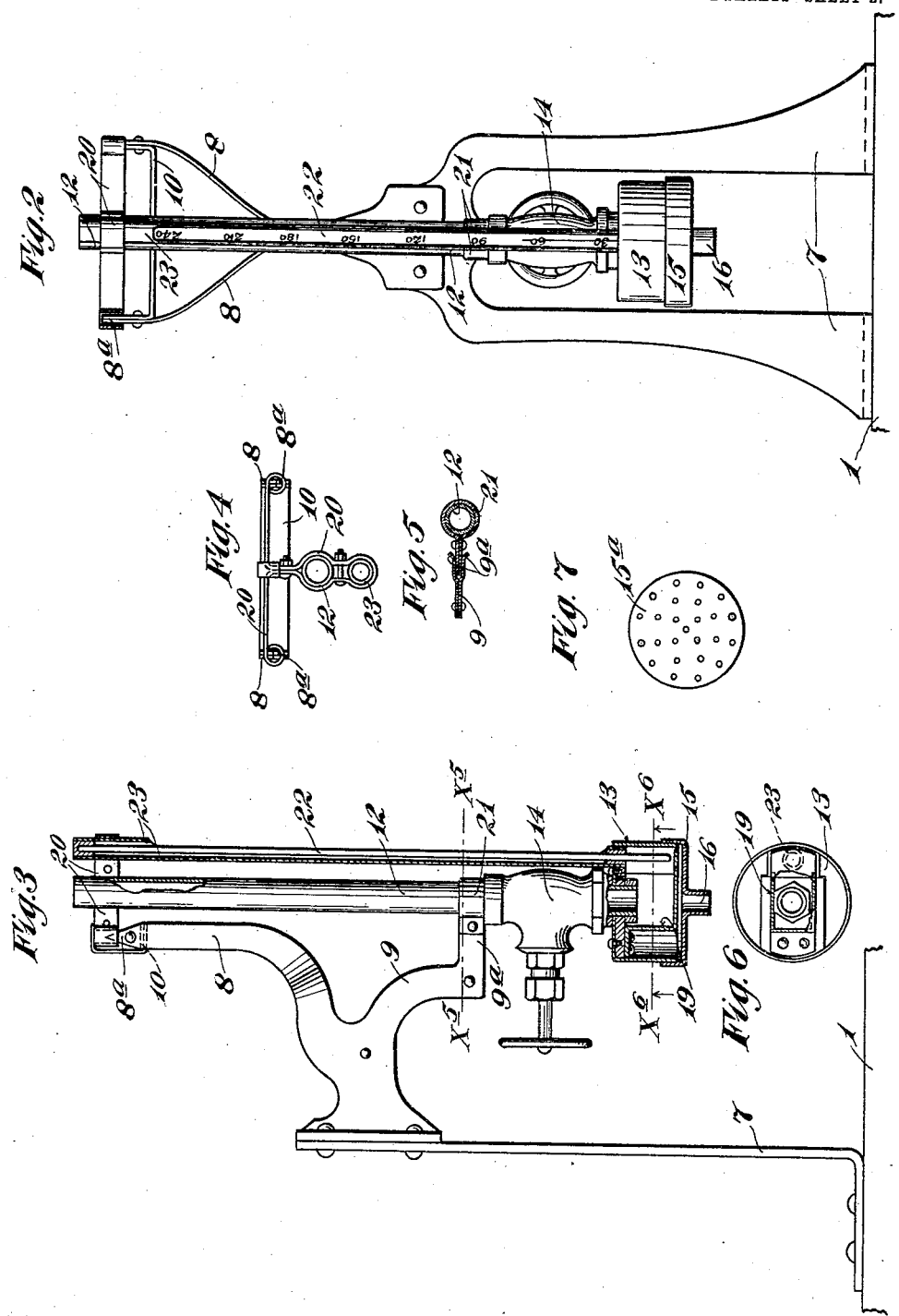

UNITED STATES PATENT OFFICE.

CHARLES E. KRUEGER AND WILLIAM H. KRUEGER, OF MINNEAPOLIS, MINNESOTA.

ATTACHMENT FOR REGULATING AND INDICATING THE TEMPERATURE OF RUNNING WATER.

936,548.  Specification of Letters Patent.  Patented Oct. 12, 1909.

Application filed July 6, 1908. Serial No. 441,990.

*To all whom it may concern:*

Be it known that we, CHARLES E. KRUEGER and WILLIAM H. KRUEGER, citizens of the United States, residing at Minneapolis, in the county of Hennepin and State of Minnesota, have invented certain new and useful Improvements in Attachments for Regulating and Indicating the Temperature of Running Water; and we do hereby declare the following to be a full, clear, and exact description of the invention, such as will enable others skilled in the art to which it appertains to make and use the same.

Our present invention has for its object to provide a simple and efficient thermometer attachment or device for indicating the temperature of water running from faucets or similar sources of supply and for regulating the temperature thereof; and to the above ends the invention consists of the novel devices and combinations of devices hereinafter described and defined in the claims.

Particularly this device will be found serviceable for use in connection with bath-tubs and wash-bowls, and especially in connection with wash-bowls or stands in barber shops.

It is a well known fact that in giving shampoos and face massage in barber shops, water is used at quite high temperature and, in fact, the water should be as hot as can be used without actually scalding the head or face. This requires careful regulation of the temperature of the water. The hands of the barber, by frequent application to extremely hot water, become so accustomed thereto that he will underestimate the temperature of the water and, hence, scald the face of the person whom he is treating. Our invention provides an extremely efficient attachment by means of which the hot and cold water may be thoroughly mixed and the temperature thereof regulated and this temperature all the time indicated to the person using the water.

The invention is illustrated in the accompanying drawings wherein like characters indicate like parts throughout the several views.

Referring to the drawings, Figure 1 is a view in elevation, showing our invention connected to a combination hot and cold water faucet of the wash-bowl. Fig. 2 is a front elevation of the attachment. Fig. 3 shows the attachment partly in side elevation and partly in vertical section. Fig. 4 is a plan view, showing in detail the removable section of the attachment. Fig. 5 is a detail in horizontal section, taken on the line $x^5$ $x^5$ of Fig. 3. Fig. 6 is a horizontal section taken on the line $x^6$ $x^6$ of Fig. 3; and Fig. 7 is a detail view in bottom plan showing a spraying cap adapted to be applied to the lower end of the water mixing chamber.

The numeral 1 indicates the wash-bowl and the numeral 2 indicates a combination hot and cold water faucet provided with a depending discharge nozzle 3 adapted to be opened to hot and cold water by valves 4, and further having an upwardly extended discharge pipe or tube 5 adapted to be opened and closed to hot and cold water by valves 6. This faucet construction forms no part of our invention. To the back of the bowl 1 is secured a bracket 7 having upwardly extended arms 8 and a depending arm 9. The arms 8, as shown, are tied together by a bar 10 and their upper ends are pointed, as shown at $8^a$. The depending arm 9, at its lower end, is extended outward and is bifurcated or forked at $9^a$.

The hot and cold water tube 5 is connected, by a flexible hose 11, to the upper end of a quite long metal tube 12, to the lower end of which a box-like water mixing chamber 13 is connected. A globe valve 14 is applied in the tube 12 just above the mixing chamber 13, and the latter is provided with a detachable lower head or bottom 15, preferably connected thereto by threaded engagement and having a depending neck 16 to which a rubber hose 17 is attached. This hose 17, as shown, is provided with a spraying nozzle 18 at its free end. Located within the mixing chamber 13 and secured at one end to the top thereof is a deflecting plate 19. This deflecting plate 19 is interposed between the lower end of the tube 12 and the depending neck 16, so that hot and cold water passing from the former to the latter will strike the deflecting plate 19 and will thereby be caused to whirl around within the mixing chamber and thereby thoroughly mix the hot and cold water before it is passed out to the said neck 16.

To the upper end of the tube 12 is secured a laterally extended coupling bracket 20, the ends of which are coiled so that they are adapted to fit upon the pointed ends $8^a$ 11 of the arms 8. To the lower portion of the tube 12, just above the valve 14, is secured a clamping collar 21 having radially projecting ends adapted to engage in the fork 9ª of the lower arm 9 of the supporting bracket 7. When the tube 12 is applied to the arms 8 and 9 as above described, it will be detachably held in working position but may be easily removed therefrom whenever desired.

A thermometer made up of the mercury tube 22 and a metallic protecting case 23 is secured at its upper end to the bracket 20, and at its lower end to the mixing chamber 13, with the lower end of said mercury tube depending into the said chamber 13 where it will be immersed in the water contained therein. The depending end of this mercury tube, it will be noted, is located directly over the lower portion of the deflecting plate 19, so that hot and cold water, while there being agitated and commingled, will be caused to circulate around the said tube and thus render the action of the thermometer efficient to indicate the exact temperature of the water.

It will, of course, be understood that the relative amounts of hot and cold water may be regulated by adjustments of the two valves 6. The device when supported as shown in the drawings is in condition for use for ordinary shampooing purposes and other uses. Sometimes, however, it is desirable to use the tube 12 with its attached commingling chamber 13 as a portable device, and when this is so it may be picked up and easily removed from a supporting bracket. By removing the cap 15 and substituting the perforated cap 15ª shown in Fig. 7, the mixing chamber 13 is caused to act as a spraying head, and in this case, of course, the tube 17 may be dispensed with. When this is done it will be sometimes necessary to provide a longer tube 11 than shown in the drawings in order to permit the required freedom of movement of the tube 12 and attached commingling chamber. When the tube 12 is held in the hand and used as a portable device, the thermometer will always be in position where the temperature of the water may be easily read by the person using the same. When it is applied as shown in the drawings the face of the thermometer will be toward the person working at the bowl, so that the temperature of the water may be easily determined.

What we claim is:

1. The combination with a bowl and a hot and cold water faucet, of a supporting bracket applied to said bowl, a valved metal tube having detachable engagement with said bracket, a flexible tube connecting said metal tube to said faucet, a mixing chamber applied to the lower end of said metal tube, and a thermometer connected to said metal tube and extended into said mixing chamber.

2. The combination with a supporting bracket having laterally spaced upwardly extended pointed arms and a lower arm with forked extremity, of a valved metal tube having a mixing chamber at its lower end, a coupling bracket applied to the upper end of said metal tube and having seats at its ends engageable with the pointed ends of the upper arms of said bracket, and having at its intermediate portion a projection engageable with the forked end of the lower arm of said bracket, and a thermometer connected to and movable with said metal tube and having a depending tube extending into said mixing chamber, the said metal tube and mixing chamber constituting part of a water conduit, and the said thermometer serving to indicate the temperature of the water flowing through said conduit.

In testimony whereof we affix our signatures in presence of two witnesses.

CHARLES E. KRUEGER.
WILLIAM H. KRUEGER.

Witnesses:
MALIE HOEL,
F. D. MERCHANT.